United States Patent
Trautman

(10) Patent No.: US 7,907,380 B2
(45) Date of Patent: Mar. 15, 2011

(54) HIGH POWER INTEGRATING POWER CONDITIONER

(75) Inventor: Robert C. Trautman, Apalachin, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 509 days.

(21) Appl. No.: 12/150,248

(22) Filed: Apr. 25, 2008

(65) Prior Publication Data
US 2009/0268364 A1  Oct. 29, 2009

(51) Int. Cl.
H02H 9/00 (2006.01)
(52) U.S. Cl. .......................................... 361/111
(58) Field of Classification Search .................. 361/111
See application file for complete search history.

(56) References Cited

U.S. PATENT DOCUMENTS

| | | | |
|---|---|---|---|
| 4,020,424 A * | 4/1977 | Burdick | 327/552 |
| 4,286,175 A | 8/1981 | Baker | |
| 4,652,769 A | 3/1987 | Smith et al. | |
| 4,808,839 A | 2/1989 | Dunn et al. | |
| 4,827,267 A | 5/1989 | Shearin | |
| 4,870,421 A | 9/1989 | Peil et al. | |
| 5,826,170 A | 10/1998 | Hirschfield et al. | |
| 6,169,459 B1 | 1/2001 | Wessendorf | |
| 6,556,685 B1 * | 4/2003 | Urry et al. | 381/94.1 |
| 6,608,445 B2 | 8/2003 | Melvin et al. | |
| 6,900,696 B2 | 5/2005 | Lautzenhiser et al. | |
| 6,922,106 B2 | 7/2005 | Lautzenhiser et al. | |
| 7,135,918 B1 | 11/2006 | Outaleb et al. | |
| 7,382,633 B2 * | 6/2008 | Aso et al. | 363/21.04 |
| 2004/0157552 A1 | 8/2004 | Eng et al. | |
| 2005/0243494 A1 | 11/2005 | Strong, III et al. | |

FOREIGN PATENT DOCUMENTS
EP 1736409 A1 12/2006

OTHER PUBLICATIONS

Peterson, et al. "Monolithic high-voltage FET power amplifiers", Microwave Symposium Digest, vol. 3, IEEE MTT-S International (Jun. 13-15, 1989), pp. 945-948.
Peterson, et al. "30-V MMIC power amplifier with novel bias circuitry", Microwave Symposium Digest, vol. 2, IEEE MTT-S International (Jun. 10-14, 1991), pp. 823-826.
Salim, et al. "Power electronics for the next century-first step", Aerospace Conference Proceedings, IEEE vol. 5, (Mar. 18-25, 2000), pp. 335-339.

* cited by examiner

*Primary Examiner* — Stephen W Jackson
(74) *Attorney, Agent, or Firm* — Wolf, Greenfield & Sacks, P.C.

(57) ABSTRACT

A high-power transient suppressor, having an input from a power source and an output to a load, includes a first power device coupled between the input and the output, a first transient detector to monitor an input voltage and to turn off the first power device in response to the input voltage exceeding a first threshold voltage, a second power device coupled between the input and the output, an integrator capacitor coupled to the output, and a second transient detector to monitor an output voltage, to switch off the second power device in response to the output voltage exceeding a second threshold voltage, and to turn on the second power device in response to the integrator capacitor discharging below the second threshold voltage.

19 Claims, 4 Drawing Sheets

HIGH POWER INTEGRATING POWER CONDITIONER

FIELD OF THE INVENTION

This invention relates to suppression of transients on power supply voltages and, more particularly, to efficient transient suppression on high-power DC supply voltages.

BACKGROUND OF THE INVENTION

High power DC supplies are used in a variety of applications. For example, a 28-volt DC power supply may be utilized for military electronic equipment on aircraft. The 28-volt supply may provide up to 45 amps to a load. Such power supplies are subject to transients generated by devices onboard the aircraft. For example, inductive devices being switched may generate substantial transients which can damage sensitive electronic devices and which can interrupt operation of electronic systems. Proper operation of electronic systems is critical to the operation of the aircraft. Mil-Std-704A establishes a power transient curve, which defines the maximum voltage transient to be 80 volts for 70 milliseconds, and the maximum energy transient to be 56 volts for 700 milliseconds, while supporting a 45-amp load.

Known prior art transient suppressors have utilized control devices such as FETs (field effect transistors) which operate in a linear region in response to a transient voltage. Operation in the linear region generates significant heat and requires the use of high power control devices.

Accordingly, there is a need for improved high-power transient suppressors and methods of transient suppression.

SUMMARY OF THE INVENTION

According to a first aspect of the invention, a high-power transient suppressor having an input from a power source and an output to a load is provided. The high-power transient suppressor comprises a first power device coupled between the input and the output, a first transient detector to monitor an input voltage and to turn off the first power device in response to the input voltage exceeding a first threshold voltage, a second power device coupled between the input and the output, an integrator capacitor coupled to the output, and a second transient detector to monitor an output voltage, to turn off the second power device in response to the output voltage exceeding a second threshold voltage and to turn on the second power device in response to the integrator capacitor discharging below the second threshold voltage.

According to a second aspect of the invention, a method for suppression of transients on a supply voltage comprises coupling a first power device between an input and an output, coupling a second power device between the input and the output, coupling an integrator capacitor to the output, turning the first power device off in response to detecting an input voltage that exceeds a first threshold voltage, turning the second power device off in response to detecting an output voltage that exceeds a second threshold voltage, and turning the second power device on in response to the integrator capacitor discharging below the second threshold voltage.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
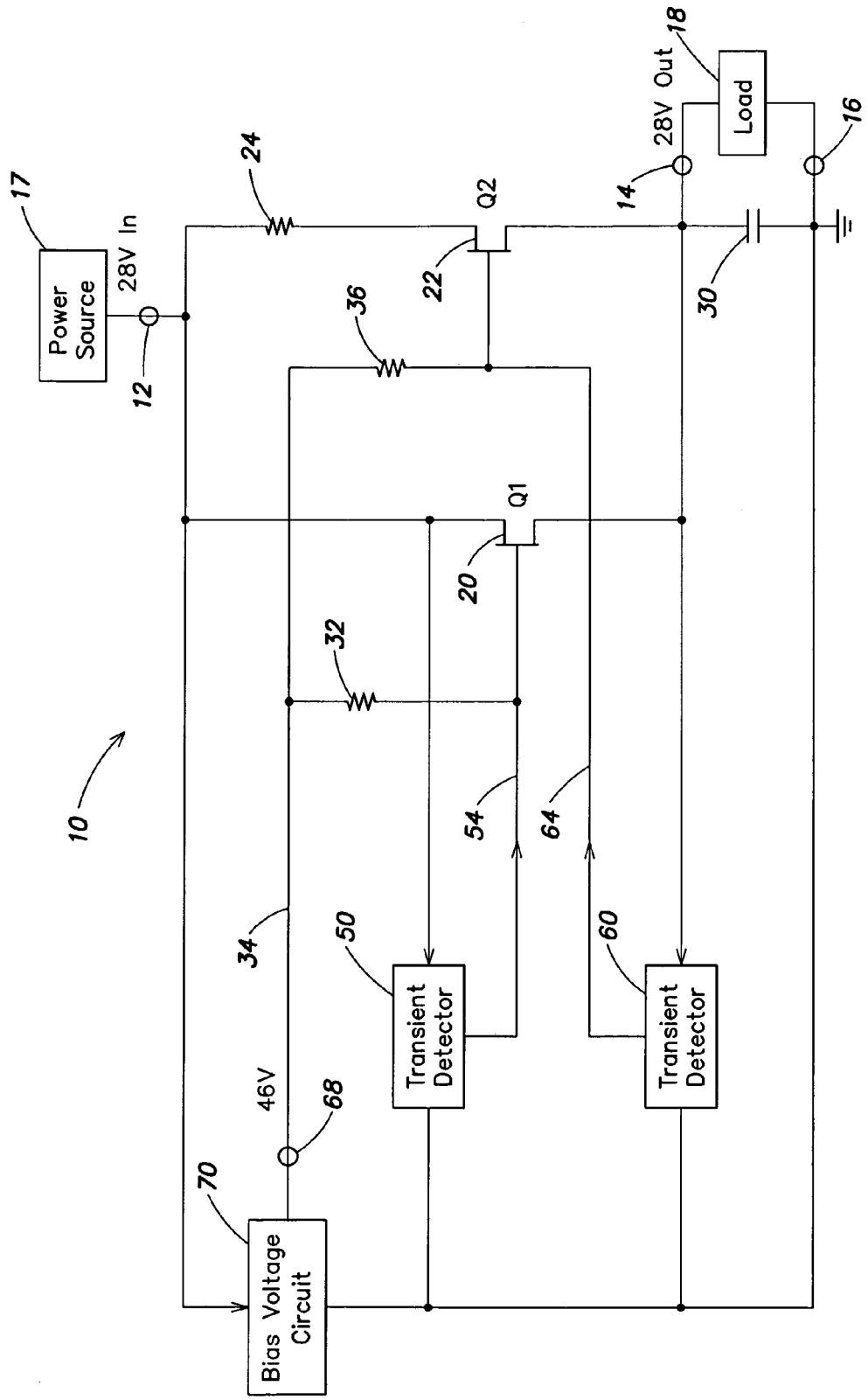
FIG. 1 is a block diagram of a high-power transient suppressor in accordance with an embodiment of the invention.
Figure 4:
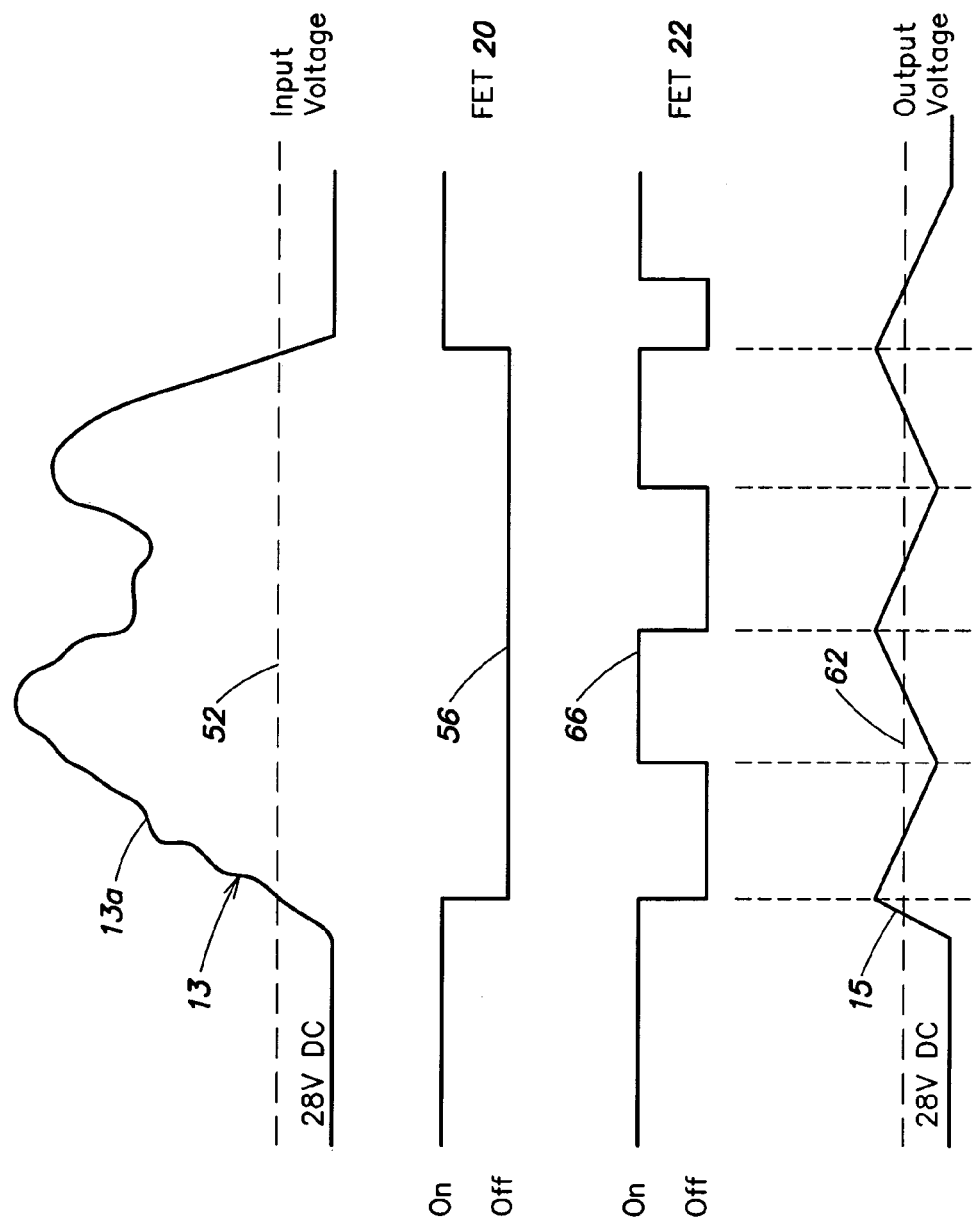
FIG. 4 is a timing diagram that illustrates operation of the transient suppressor.

A block diagram of a high-power transient suppressor 10 in accordance with an embodiment of the invention is shown in FIG. 1. Waveforms associated with operation of the transient suppressor are shown in FIG. 4. The transient suppressor 10 has an input 12 that receives an input voltage 13 (FIG. 4) from a power source 17 and an output 14 that supplies an output voltage 15 (FIG. 4) to a load 18. The input 12 and the output 14 are referenced to a reference voltage 16, such as ground. During normal operation, the input and output voltages are at or near the nominal operating voltage of the power source. If a transient voltage appears at input 12, the transient voltage is suppressed at output 14. In the embodiment of FIG. 1, the power source operates at 28 volts DC. It will be understood that this voltage is given by way of example only and is not limiting as to the scope of the present invention.

The transient suppressor includes two power devices which may be power FET's (field effect transistors). A first power FET 20 has its drain coupled to input 12 and its source coupled to output 14. A second power FET 22 has its drain coupled to a resistor 24 and its source coupled to output 14. Resistor 24 is coupled to input 12, so that resistor 24 and second power FET 22 are connected in series between input 12 and output 14. An integrator capacitor 30 is coupled between output 14 and reference voltage 16. The gate of first power FET 20 is connected through a resistor 32 to a bias voltage 34, and the gate of second power FET 22 is connected through a resistor 36 to bias voltage 34. Bias voltage 34 is selected to insure that power FETs 20 and 22 are fully on in the absence of a transient at input 12.

A first transient detector 50 is coupled to input 12 and monitors an input voltage on input 12. First transient detector 50 defines a first threshold voltage 52 (FIG. 4). The first threshold voltage 52 establishes the voltage at which transient detector 50 is triggered into operation by a transient voltage 13a (FIG. 4) on input 12. If the input voltage 13 exceeds the first threshold voltage 52, first transient detector 50 generates a first control voltage 54 that is coupled to the gate of first power FET 20 and switches off first power FET 20.

A second transient detector 60 is coupled to output 14 and monitors an output voltage on output 14. Second transient detector 60 defines a second threshold voltage 62 (FIG. 4). If the output voltage 15 exceeds the second threshold voltage 62, second transient detector 60 generates a second control voltage 64 that is coupled to the gate of second power FET 22 and switches off second power FET 22.

The first and second threshold voltages 52 and 62 may be the same or different. For a 28 volt DC power supply, the first and second threshold voltages may be 30 volts, for example. It will be understood that these threshold voltages are given by way of example only and are not limiting as to the scope of the present invention.

Transient suppressor 10 further includes a bias voltage connection 68 for connection to a bias voltage source. In the embodiment of FIG. 1, a bias voltage circuit 70 supplies bias voltage 34. In other embodiments, a suitable bias voltage may be available in the system, and bias voltage circuit 70 may be omitted. By way of example only, bias voltage 34 may be 46 volts for a 28 volt DC power supply. The bias voltage 34 is selected to insure that power FETs 20 and 22 are fully on in the absence of a transient voltage. In one example, bias voltage circuit 70 is a voltage multiplier which generates bias voltage 34 from the 28 volt DC input voltage. However, any suitable bias voltage circuit may be utilized.

In the absence of a transient voltage at input 12, first power FET 20 and second power FET 22 are turned fully on by bias voltage 34 applied to the gates of the respective transistors. Integrator capacitor 30 is charged to the output voltage. Now assume that an unwanted transient voltage 13a (FIG. 4) appears at input 12. If the transient voltage exceeds the first threshold voltage 52, first transient detector 50 detects the transient at input 12 and immediately turns off first power FET 20, as indicated by waveform 56 in FIG. 4. Similarly, if the transient exceeds the second threshold voltage 62, second transient detector 60 detects the transient at output 14 and immediately turns off second power FET 22, as indicated by waveform 66 in FIG. 4. Since power FET's 20 and 22 are both turned off, any transient that exceeds the first and second threshold voltages is blocked from reaching output 14. At the instant when power FET 22 is switched off, output 14 is at or slightly above the second threshold voltage 62 and integrator capacitor 30 begins to discharge, since current is being drawn by the load. When the output voltage drops below the second threshold voltage 62, transient detector 60 switches states and causes second power FET 22 to be turned on. Integrator capacitor 30 then charges through resistor 24 and the output voltage may again exceed the second threshold voltage 62 if the transient voltage is still present at input 12. Thus, transient detector 60 again turns second power FET 22 off and integrator capacitor 30 again begins to discharge. The sequence wherein power FET 22 alternates between on and off, as indicated by waveform 66 in FIG. 4, may continue as long as the transient voltage 13a is present at input 12. Thus, integrator capacitor 30 supplies the necessary load current during the transient voltage and is charged by a pulsed current through resistor 24 and second power FET 22 during the times when second power FET 22 is switched on.

Resistor 24 and integrator capacitor 30 function as an integrator with capacitor 30 being charged through resistor 24 when power FET 22 is turned on. The rate of charging is determined by the RC time constant of resistor 24 and capacitor 30. The integrator is enabled when power FET 22 is turned on and is disabled when power FET is turned off.

Figure 2:
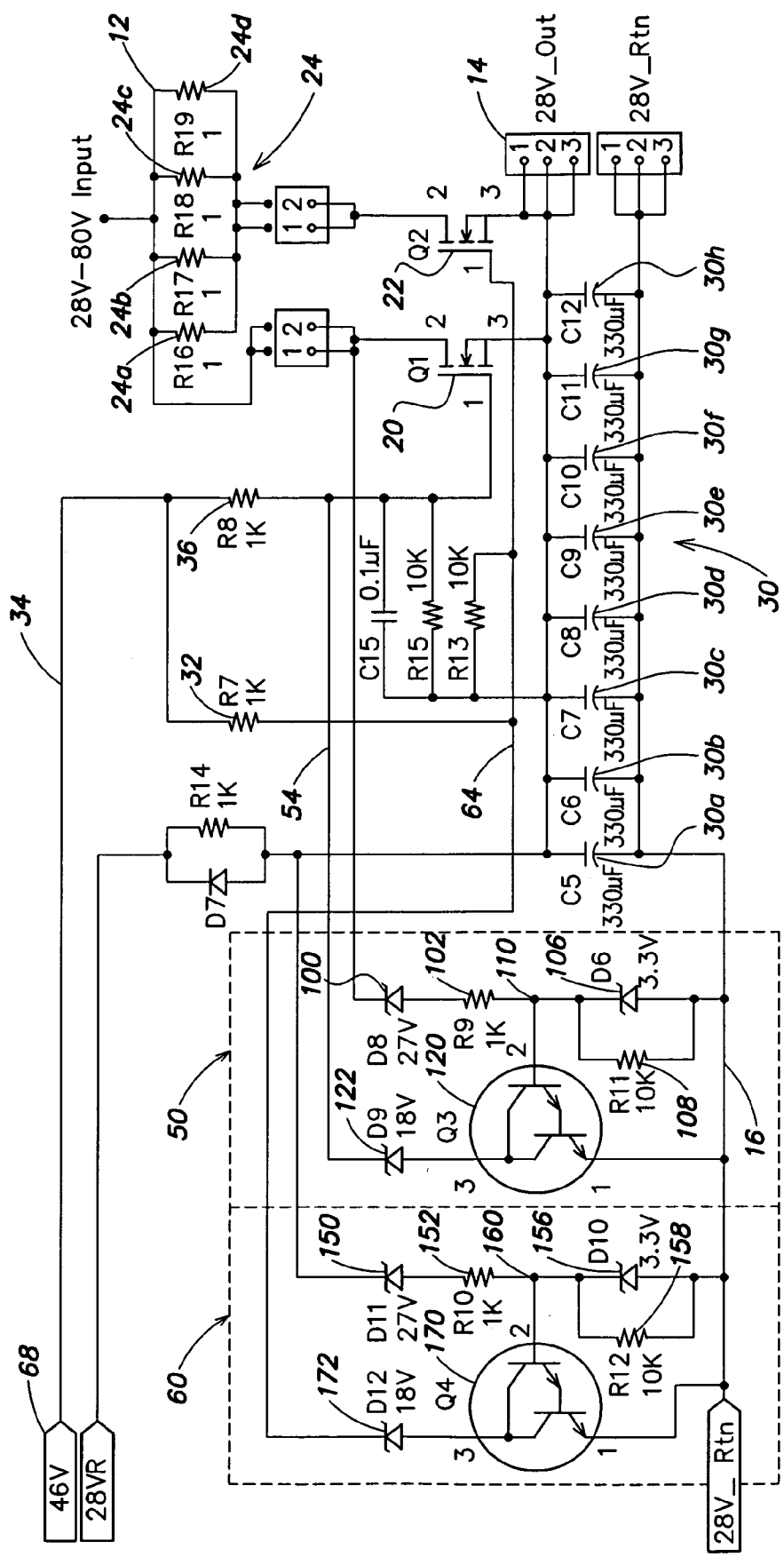
FIG. 2 is a schematic diagram of a transient suppressor circuit in accordance with an embodiment of the invention.
Figure 3:
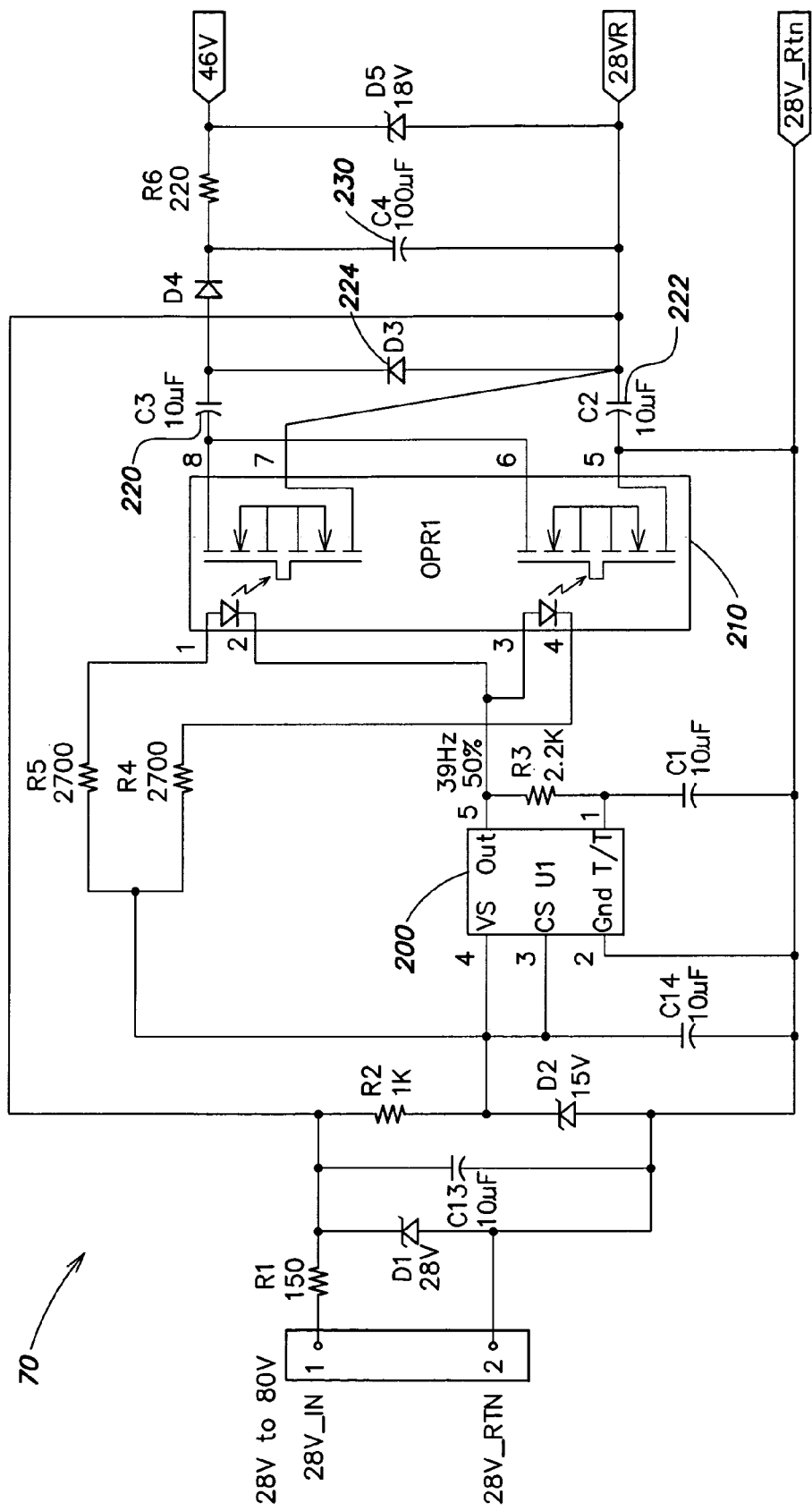
FIG. 3 is a schematic diagram of a bias voltage circuit in accordance with an embodiment of the invention.

An implementation of transient suppressor 10 is shown in FIGS. 2 and 3. Like elements in FIGS. 1-3 have the same reference numerals. As shown in FIG. 2, resistor 24 may be implemented as a bank of four power resistors 24a-24d connected in parallel, each having a value of one ohm and a rating of 25 watts. Capacitor 30 may be implemented as a bank of eight capacitors 30a-30h connected in parallel, each having a value of 330 microfarads and a rating of 60 volts. It will be understood that different resistor and capacitor configurations may be utilized within the scope of the invention, depending on the voltage and current rating of the power source, the current drawn by the load and the characteristics of expected transients.

As shown in FIG. 2, transient detector 50 has a voltage sensing circuit including a zener diode 100, a resistor 102 and a zener diode 106 connected in series between input 12 and reference voltage 16. A resistor 108 is connected in parallel with zener diode 106. A node 110 interconnects resistor 102 and zener diode 106. Transient detector 50 further includes a high-gain switching device, such as a Darlington transistor 120. The base of transistor 120 is connected to node 110, and the emitter of transistor 120 is connected to reference voltage 16. The collector of transistor 120 is connected through a zener diode 122 to the gate of first power FET 20 and provides the first control voltage 54.

Zener diodes 100 and 106 do not conduct appreciable current when input 12 is at its normal operating voltage, but begin to conduct when input 12 is subjected to a transient voltage that exceeds the first threshold voltage 52. By way of example only, zener diode 100 can be rated at 27 volts and zener diode 106 can be rated at 3.3 volts, so that the first threshold voltage 52 is 30.3 volts. When zener diode 100 conducts, transistor 120 is switched on and provides first control voltage 54 to the gate of first power FET 20, causing power FET 20 to switch off. Power FET 20 remains off as long as the transient voltage at input 12 exceeds the first threshold voltage 52.

As further shown in FIG. 2, transient detector 60 has a voltage sensing circuit including a zener diode 150, a resistor 152 and a zener diode 156 connected in series between output 14 and reference voltage 16. A resistor 158 is connected in parallel with zener diode 156. A node 160 interconnects resistor 152 and zener diode 156. Transient detector 60 further includes a high-gain switching device, such as a Darlington transistor 170. The base of transistor 170 is connected to node 160, and the emitter of transistor 170 is connected to reference voltage 16. The collector of transistor 170 is connected through a zener diode 172 to the gate of second power FET 22 and provides the second control voltage 64.

Zener diodes 150 and 156 do not conduct appreciable current when output 14 is at its normal operating voltage, but begin to conduct when output 14 is subjected to a transient voltage that exceeds the second threshold voltage 62. By way of example only, zener diode 150 can be rated at 27 volts and zener diode 156 can be rated at 3.3 volts, so that the second threshold voltage 62 is 30.3 volts. When zener diode 150 conducts, transistor 170 is switched on and provides second control voltage 64 to the gate of second power FET 22, causing power FET 22 to switch off.

The transient detectors 50 and 60 shown in FIG. 2 and described above use Darlington transistors for high gain and fast switching. However, other switching devices may be utilized within the scope of the invention. In some embodiments, optical FET switches may be utilized in place of the Darlington transistors.

When power FET 22 is switched off, output 14 is at or slightly above the second threshold voltage 62 and capacitors 30a-30h begin to discharge due to current being drawn by the load. When capacitors 30a-30h discharge sufficiently that the output voltage drops below the second threshold voltage 62, transient detector 60 switches states and causes second power FET 22 to be turned on. Capacitors 30a-30h then charge through resistors 24a-24d and the output voltage may again exceed the second threshold voltage 62 if the transient voltage is still present at input 12. Thus, transient detector again turns second power FET 22 off and capacitors 30a-30h again begin to discharge. This sequence may continue as long as the transient voltage is present at input 12.

The transient suppressor 10 of FIGS. 1 and 2 thus operates as an integrating transient suppressor, since capacitors 30a-30h alternatively charge through resistors 24a-24d and discharge to the load during a transient voltage at input 12. When the transient voltage is present, power FET 20 switches from fully on to fully off and power FET 22 alternates between fully on and fully off. As a result, power FETs 20 and 22 do not operate in the linear region and power dissipation is limited.

A schematic diagram of an implementation of bias voltage circuit 70 is shown in FIG. 3. In the embodiment of FIG. 3, bias voltage circuit 70 is implemented as a voltage multiplier, also known as a charge pump, which produces an output voltage that is greater than its input voltage. In the embodiment of FIG. 3, the voltage multiplier converts an input voltage of 28 volts DC to an output voltage of 46 volts DC.

Referring to FIG. 3, bias voltage circuit 70 includes an oscillator 200 that generates an oscillatory output signal. In the example of FIG. 3, oscillator 200 produces an output at 39 Hertz and 50% duty cycle. The output of oscillator 200 is provided to a dual optical switching device 210. Depending on the input to pins 1 and 2 of switching device 210, output pins 7 and 8 may be shorted or open, and depending on the input to pins 3 and 4 of switching device 210, output pins 5 and 6 may be shorted or open. Output pins 7 and 8 of switching device 210 are connected to the negative side of a capacitor 220. An output pin 5 of switching device 210 is connected to the negative side of a capacitor 222, and an output pin 7 of switching device 210 is connected to the positive side of capacitor 222. The positive sides of capacitors 220 and 222 are connected via a diode 224. The dual optical switching device 210 should have a "break-before-make" contact characteristic to prevent undesired discharging of the parallel-charged capacitors and also the possibility of damage to the optical switching device by excessive, momentary current.

In operation, oscillator 200 causes switching device 210 to alternate between pins 7 and 8 being shorted and pins 5 and 6 being shorted. When pins 5 and 6 are shorted, capacitors 220 and 222 are effectively connected in parallel. When pins 7 and 8 are shorted, capacitors 220 and 222 are effectively connected in series, so that their voltages add. A capacitor 230 filters the voltage produced by the parallel charging and series discharging of capacitors 220 and 222 to provide a voltage that is greater than the input voltage. The output voltage is nominally 46 volts DC for a 28 volt DC input.

The bias voltage circuit 70 shown in FIG. 3 and described above is given by way of example only and is not limiting as to the scope of the present invention. A variety of different bias voltage circuits may be utilized, depending on the voltage available in the system. If the available voltage is lower than the required bias voltage, a voltage multiplier may be utilized. Various voltage multiplier circuits are known in the art. If the available voltage is greater than the required bias voltage, a voltage regulator may be utilized to reduce the available voltage. In a case where a suitable voltage is available in the system, that voltage may be used directly and the bias voltage circuit may be omitted.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A high-power transient suppressor having an input from a power source and an output to a load, comprising:
   a first power device coupled between the input and the output;
   a first transient detector to monitor an input voltage and to turn off the first power device in response to the input voltage exceeding a first threshold voltage;
   a second power device coupled between the input and the output;
   an integrator capacitor coupled to the output; and
   a second transient detector to monitor an output voltage, to turn off the second power device in response to the output voltage exceeding a second threshold voltage and to turn on the second power device in response to the integrator capacitor discharging below the second threshold voltage.

2. A high-power transient suppressor as defined in claim 1, wherein the first transient detector comprises a first zener diode that establishes the first threshold voltage and a first switching device that turns off the first power device in response to the first zener diode detecting that the input voltage exceeds the first threshold voltage.

3. A high power transient suppressor as defined in claim 2, wherein the second transient detector comprises a second zener diode that establishes the second threshold voltage and a second switching device that turns off the second power device in response to the second zener diode detecting that the output voltage exceeds the second threshold voltage.

4. A high-power transient suppressor as defined in claim 1, wherein the first and second power devices switch between fully on and fully off in response to the first and second transient detectors, respectively.

5. A high-power transient suppressor as defined in claim 1, wherein the integrator capacitor supplies current to the load when the first and second power devices are turned off.

6. A high-power transient suppressor as defined in claim 1, further comprising a resistor connected in series with the second power device between the input and the output.

7. A high-power transient suppressor as defined in claim 1, further comprising a bias voltage connection receiving a bias voltage to turn the first power device fully on when the input voltage does not exceed the first threshold voltage and to turn the second power device fully on when the output voltage does not exceed the second threshold voltage.

8. A high-power transient suppressor as defined in claim 7, further comprising a bias voltage circuit coupled to the bias voltage connection to supply the bias voltage.

9. A high-power transient suppressor as defined in claim 8, wherein the bias voltage circuit comprises a voltage multiplier to generate the bias voltage.

10. A high-power transient suppressor as defined in claim 9, wherein the voltage multiplier includes a double-pole optical FET device that alternates between parallel charging and series discharging of two capacitors.

11. A high-power transient suppressor as defined in claim 1, wherein the first and second power devices comprise power FET's.

12. A high-power transient suppressor as defined in claim 3, wherein the first switching device and the second switching device each comprise a Darlington transistor.

13. A method for suppression of transients on a supply voltage, comprising:
   coupling a first power device between an input and an output;
   coupling a second power device between the input and the output;
   coupling an integrator capacitor to the output;
   turning the first power device off in response to detecting an input voltage that exceeds a first threshold voltage;
   turning the second power device off in response to detecting an output voltage that exceeds a second threshold voltage; and
   turning the second power device on in response to the integrator capacitor discharging below the second threshold voltage.

14. A method as defined in claim 13, wherein turning the first power device off comprises detecting that the input voltage exceeds the first threshold voltage with a first zener diode and switching the first power device with a first switching device that switches states in response to the first zener diode detecting that the input voltage exceeds the first threshold voltage.

15. A method as defined in claim 14, wherein turning the second power device off comprises detecting that the output voltage exceeds the second threshold voltage with a second zener diode and switching the second power device with a second switching device that switches states in response to the second zener diode detecting that the output voltage exceeds the second threshold voltage.

16. A method as defined in claim 13, wherein turning the first power device off and turning the second power device off comprises switching the first and second power devices between fully on and fully off.

17. A method as defined in claim 13, wherein the integrator capacitor supplies current to the load when the first and second power devices are switched off.

18. A method as defined in claim 13, further comprising generating a bias voltage to turn the first power device fully on when the input voltage does not exceed the first threshold voltage and to turn the second power device fully on when the output voltage does not exceed the second threshold voltage.

19. A method as defined in claim 18, wherein generating a bias voltage comprises generating the bias voltage with a voltage multiplier.

\* \* \* \* \*